Dec. 16, 1941.  A. HOLLANDER ET AL  2,266,039
SUBMERSIBLE MOTOR STRUCTURE
Filed June 11, 1940
*Fig. 1.*
*Fig. 2.*
*Fig. 3.*
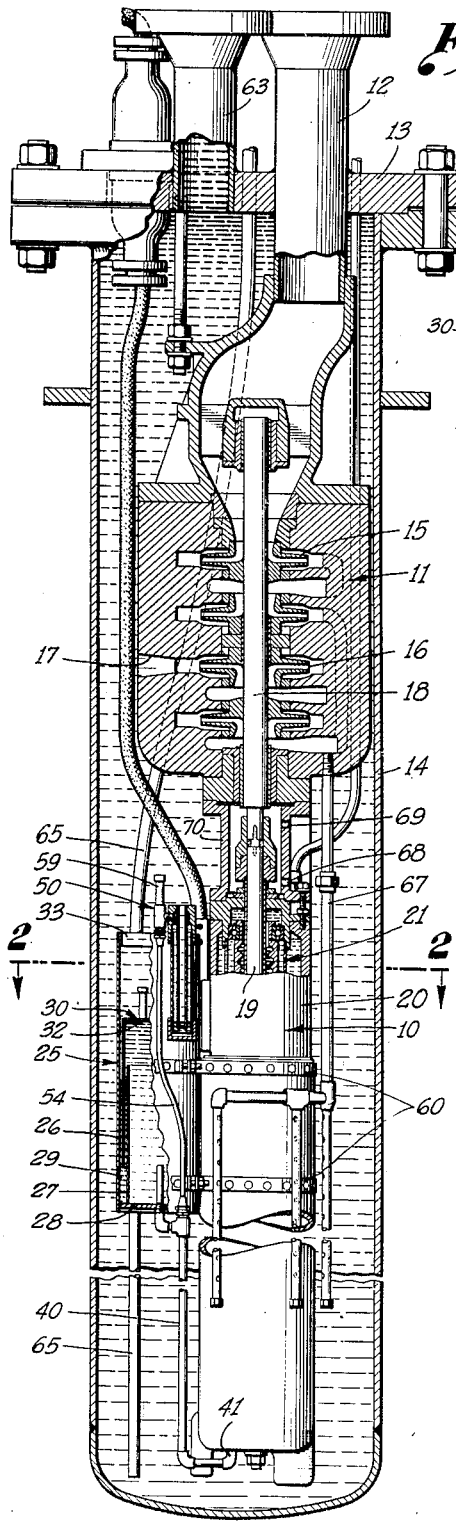
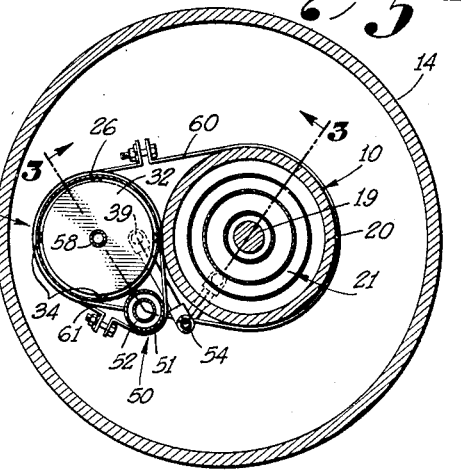
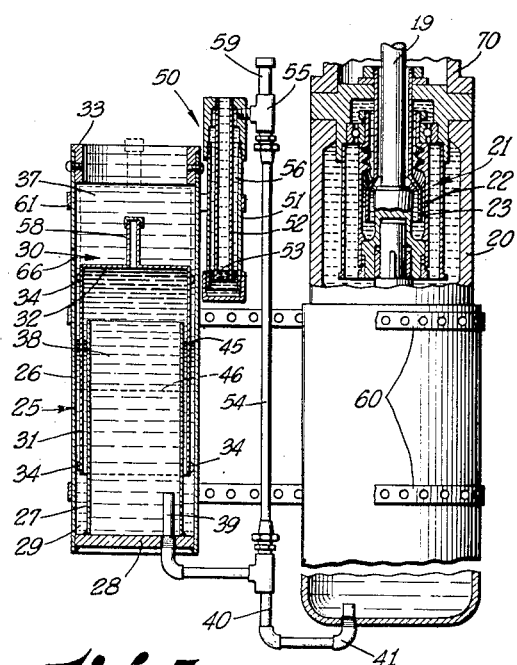
ALADAR HOLLANDER,
VAINO A. HOOVER,
INVENTORS.
BY Lyon & Lyon
ATTORNEYS.

Patented Dec. 16, 1941

2,266,039

UNITED STATES PATENT OFFICE 2,266,039

SUBMERSIBLE MOTOR STRUCTURE

Aladar Hollander and Vaino A. Hoover, Los Angeles, Calif., assignors to Byron Jackson Co., Huntington Park, Calif., a corporation of Delaware Application June 11, 1940, Serial No. 339,897

7 Claims. (Cl. 172—36)

This invention relates generally to submersible electric motors, and particularly to a submersible electric motor of the type in which the motor housing is filled with a dielectric liquid and is adapted to operate for an indefinite period while completely submerged in an external liquid.

In motors of the foregoing type, the heat generated in the motor windings during operation of the motor produces a material rise in the temperature of the dielectric liquid within the motor housing, and therefore provision must be made for allowing the dielectric liquid to expand and to subsequently contract when the motor is de-energized and the dielectric liquid cools down. This has heretofore been successfully accomplished under certain conditions by providing an expansion chamber in the lower portion of the motor housing and establishing communication between this chamber and the external liquid. The expansion chamber contains contacting bodies of dielectric liquid and external liquid in pressure-balanced relation, and the surface of contact of the liquids rises and falls as the dielectric liquid contracts and expands. An example of the foregoing construction is illustrated in our U. S. Letters Patent No. 2,171,749, dated September 5, 1939, for Submersible motor assembly.

A pressure-equalizing and expansion chamber such as the foregoing is only satisfactory, however, if the dielectric liquid and the external liquid are immiscible with each other and their specific gravities differ materially. Otherwise the dielectric liqud would become progressively contaminated with external liquid and might eventually damage the motor. In order to overcome this objection and to enable a submersible motor of the foregoing type to be immersed in a liquid which is readily miscible with the dielectric liquid, it has prevously been proposed to isolate the bodies of internal and external liquids in the expansion chamber from each other by a movable baffle or separating member having a wall extending below the surface of a body of relatively heavy sealing liquid. Such an arrangement will operate satisfactorily after normal operating conditions have once been established, but it offers installation difficulties and requires expert regulation of the amount of dielectric liquid in the motor after the installation has been made, in order to establish proper operating conditions.

A principal object of this invention is to provide a submersible electric motor adapted to operate in a liquid which is miscible with the dielectric liquid in the motor housing, and in which the above-mentioned installation difficulties are avoided. More specifically, the invention aims to provide a construction which enables the motor housing to be filled with approximately the correct amount of dielectric liquid prior to its immersion in the external liquid, and in which the adjustment of the relative amounts of dielectric and external liquids in the balance chamber is effected automatically during the initial period of operation of the motor, thus eliminating all manual manipulation after the unit is installed.

In order to insure that a submersible motor of the foregoing type will operate satisfactorily for an indefinite period of time while immersed in a liquid which is miscible with the dielectric liquid, it is essential that the liquid seal about the shaft and that associated with the expansion chamber contain predetermined amounts of sealing liquid, and that these amounts be maintained constant. In the absence of means preventing abnormal displacement of the sealing liquid, there is the possibility that during the initial period of adjustment of the pressure balancing and expansion means, the sealing liquid in one or both of the seals may be displaced sufficiently to result in loss of sealing liquid, thus impairing the effectiveness of the seal during subsequent operation of the motor.

A further object of the invention is to preclude the possibility of abnormal displacement of the sealing liquid in the shaft seal or in the expansion chamber seal, by the provision of auxiliary sealing means permitting the pressure balancing and expansion means to adjust itself to normal operating conditions, while limiting the displacement of the sealing liquid to an extent safely below that which would result in loss of sealing liquid.

The manner in which the foregoing and other objects are attained will be apparent from the following detailed description of a preferred embodiment of the invention, reference being had to the accompanying drawing wherein:

Fig. 1 is a view, partly in longitudinal section and partly in elevation, illustrating the application of our improved submersible motor to a submersible motor-pump unit particularly adapted to handling highly volatile liquids;

Fig. 2 is transverse sectional view on an enlarged scale, taken on line 2—2 of Fig. 1; and Fig. 3 is a longitudinal sectional view taken on line 3—3 of Fig. 2.

A submersible electric motor embodying our novel sealing and pressure equalizing means is particularly useful in conjunction with pumping apparatus employed in handling liquids which are readily miscible with the dielectric liquid in the motor housing. Liquefied petroleum gases such as butane and propane are of this type, and, because of their high vapor pressure, present a pumping problem for which a submersible motor-pump unit offers an ideal solution. Hence we have illustrated the invention as applied to a pumping unit which is particularly adapted to handle such liquids.

Referring to Fig. 1 of the accompanying drawing, a submersible electric motor, generally designated 10, is suspended from the lower side of a pump 11 which in turn is suspended from a suction pipe 12 attached to a cover plate 13. The latter forms a removable closure for the upper end of a barrel or receiver 14 constituting a fluid-tight enclosure for the pump and motor. The pump 11 is in this instance a multistage centrifugal pump of conventional design, and is shown herein as having four impellers arranged in two opposed groups, the uppermost impeller 15 constituting the first stage and the final stage impeller 16 discharging through an outlet 17 in the pump casing directly into the receiver 14. The impellers are mounted on an impeller shaft 18 projecting through the lower end of the pump casing into driven relationship with the upwardly protruding end of a motor shaft 19.

The motor 10 is preferably of the type described in our Patent No. 2,171,749, dated September 5, 1939, for Submersible motor assembly, in which the motor housing 20 is filled with a dielectric liquid and the juncture of the motor shaft 19 and the housing 20 is sealed by a liquid seal generally designated 21. The latter is fully described in our aforementioned patent, and hence a detailed description thereof is deemed unnecessary. It will suffice to state that liquid seals of this type comprise generally a cup 22, Fig. 3, secured to and rotatable with the motor shaft and containing a body of heavy liquid such as mercury, and a stationary baffle 23 secured at its upper end to the housing and having its lower end dipping into the mercury and thus forming two isolated chambers communicating respectively with the internal and external liquids.

An inherent characteristic of liquid seals such as that referred to above is that the sealing liquid is capable of being displaced by a preponderance of pressure in the internal or external liquid. For this reason, provision is made for equalizing the pressures of the two liquids at all times, and for enabling the volume of internal liquid to fluctuate within a wide range without disturbing the pressure balance. The latter is rendered necessary by the expansion and contraction of the internal liquid due to temperature changes in the motor.

In the present instance a mercury-sealed expansion chamber, generally designated 25, is attached to the motor housing in any suitable manner and contains separate bodies of internal liquid and external liquid isolated from each other by a mercury sealed separating member. As shown most clearly in Fig. 3, the expansion chamber 25 comprises an outer wall 26 and an inner wall 27, the two walls being secured in fluid-tight relation to a base member 28 and the inner wall 27 being spaced inwardly of the outer wall to form an annular chamber 29 for sealing liquid such as mercury. It will be observed that both of the walls 26 and 27 are open at their upper ends, and that the outer wall extends upwardly a considerable distance above the inner wall. An inverted cup-shaped separating member 30 is mounted in the chamber, and comprises a cylindrical side wall 31 extending downwardly within the annular mercury chamber 29 in telescopic relation to the inner wall 27, and a closed upper end 32 movable between the upper extremities of the inner and outer walls. An internal ring 33 is secured to the upper end of the outer wall 26 to form a stop for limiting the upward movement of the separating member. A plurality of guide lugs 34 are formed on the outer surface of the separating member at suitably spaced points to guide the latter and maintain it in coaxial relation to the inner and outer walls 26 and 27.

The separating member 30 thus divides the chamber 25 into an outer compartment 37 in open communication with the interior of the receiver 14, and an inner compartment 38 which is sealed from the outer compartment by the mercury in the annular chamber 29. A fitting 39 is secured to the base member 28 and is connected to a conduit 40 extending to a fitting 41 secured to the base of the motor housing 20, thus establishing open communication between the interior of the motor housing and the inner compartment 38.

The level of the mercury in the annular chamber 29 is indicated at 45, and it will be observed that the side wall 31 of the separating member 30 extends downwardly below this level for a distance which is materially greater than the distance between the upper wall 32 of the separating member and the stop ring 33. Thus the wall 31 always extends below the surface 45 of the mercury and forms a seal between the compartments irrespective of the extent of vertical displacement of the separating member. The position assumed by the lower edge of the separating member when the latter is in its uppermost position is indicated by the dotted line 46, and it is thus seen that even in its uppermost position the mercury seal cannot be broken except by a preponderance of pressure on one side sufficient to support a column of mercury of a height equal to twice the distance between the level 45 and the dotted line 46. It is very unlikely that a pressure difference of such magnitude will occur, but in order to positively prevent its occurrence, we provide a safety device which is operable to relieve any pressure difference when it reaches a value very materially lower than that required to break the seal at 45.

This safety device is in the form of an auxiliary mercury seal, generally designated 50, and comprises an outer shell 51 having a closed lower end and an inner tube 52 secured to the upper end of the outer shell and extending in spaced relation to the inner wall thereof to a point adjacent the bottom of the shell. The tube is open at both ends, and its lower end extends a short distance below the level 53 of a body of mercury contained in the outer shell. A branch conduit 54 extends from the conduit 40 to a fitting 55 connected to the shell 51, thus placing the annular channel 56 between the shell 51 and the tube 52 in open communication with the interior of the motor housing 20 and with the inner compartment 38 of the expansion chamber 25. The interior of the tube 52, which is in open communication with the interior of the receiver 14, is thus separated, by the mercury in the shell, from the annular channel 56. It will be observed, however, that the tube 52 extends only a relatively short distance below the mercury level 53, as compared to the depth of immersion of the separating member 30 when in its uppermost position. Consequently, a relatively small pressure difference of predetermined magnitude in the internal and external liquids will displace the mercury in the shell 51 and allow a small amount of the liquid at the higher pressure to bubble over into the other liquid and thus restore the pressure balance. A capped vent tube 58 is provided on the upper wall of the separating member 30, and a similar vent tube 59 is provided at the upper end of the conduit 54 above the fitting 55.

Referring again to Fig. 1, it will be observed that the upper surface of the auxiliary seal 50 is at substantially the same elevation as the top of the motor housing 20, and that the uppermost position of the vertically movable separating member 30 is slightly below this level. This arrangement enables the motor housing to be filled with dielectric liquid before the motor-pump unit is inserted in the outer receiver 14, and, by opening the vent tubes 58 and 59 to vent the air from the compartment 38, annular channel 56, and conduit 54, the dielectric liquid will flow from the lower end of the motor housing through the conduit 40 into these chambers and fill them. The vent tubes are then permanently closed.

The expansion chamber 25 and the auxiliary seal 50 may be attached to the motor housing 20 in any suitable manner. We have shown a simple and convenient arrangement, including one or more metal straps 60, of the type commonly used by plumbers, securing the expansion chamber to the motor housing, and a similar strap 61 securing the seal chamber 51 to the expansion chamber.

From the foregoing description, the operation of the pressure equalizing and expansion means will be apparent. The motor-pump unit and its auxiliary control devices are suspended as a unit from the under side of the cover plate 13, and, when the latter is secured in fluid-tight relation to the receiver 14, the latter forms a container which is completely closed except for the suction nozzle 12 and the discharge nozzle 63 secured to the cover plate. Upon filling the receiver with pump liquid preparatory to starting the pumping operation, the pump liquid enters the outer compartment 37 of the expansion chamber 25 and exerts pressure against the upper surface of the separating member 30 and against the surface of the mercury in the annular space between the wall 31 and the outer wall 26 of the expansion chamber. It also enters the tube 52 in the auxiliary seal 50 and exerts pressure against the surface of the mercury in the lower portion of the tube. The pump liquid also contacts the mercury in the rotating seal 21 on one side of the stationary baffle 23 around the motor shaft 19. Thus it is seen that pressure transfer relation between the pump liquid and the dielectric liquid is established at three separate points, but direct contact between the two liquids is prevented by the mercury seals at these points.

Particular attention is directed to the fact that by reason of the location of the three liquid seals at approximately the same level adjacent the upper end of the motor housing, the motor housing and the expansion chamber may be completely filled with dielectric liquid, or filled to any desired level, without causing more than a slight displacement of mercury in any of the seals. It is thus possible to fill the motor before it is immersed in the external liquid. On the other hand, if the expansion chamber and its liquid seal were disposed in the lower portion of the motor at a level considerably below the shaft seal, as heretofore proposed, when the motor is filled with dielectric liquid the hydrostatic head of liquid above the expansion chamber seal would displace the mercury therein unless the latter were subjected to an equal pressure on the opposite side. For this reason, in the latter case the motor could not be filled with dielectric liquid until it is immersed in the external liquid. Serious complications would arise if the external liquid were a highly volatile liquid such as one of the liquefied petroleum gases, inasmuch as such liquids must be subjected to superatmospheric pressure in order to maintain them in the liquid phase. The construction illustrated and described herein is, for this reason, particularly advantageous in that it eliminates the necessity of completing the filling of the motor housing with dielectric liquid after the motor is immersed in the external liquid.

That the placing of the expansion chamber seal near the upper end of the motor housing near the level of the main seal is a real, and not merely a theoretical, advantage, will be apparent from the following considerations: In an actual construction with the relative proportions shown in Fig. 3, suppose the dimensions are such that the upper edge of the inner wall 27 is approximately three inches above the dotted line 46, which indicates the uppermost position of the lower edge of the floating separating member 30. The mercury level 45 is located approximately midway between these two levels, in order to permit equal displacement of mercury either inwardly or outwardly before breaking the seal or spilling mercury over the upper edge of the wall 27. Thus there would be only approximately one and one-half inches of mercury above the lower edge of the separating member when the latter is in its uppermost position. Assuming further that the areas of the two annular channels on opposite sides of the separating member are equal, a column of mercury three inches in height would be formed in the outer channel if all the mercury were displaced outwardly below the outer edge of the separating member 30. Since the specific gravity of mercury is about seventeen times that of oil, this three inch column of mercury would balance a column of oil only about four feet three inches in height, whereas motor housings such as the one illustrated in Fig. 3 are from six to eight feet in height. It is apparent, therefore, that if the expansion chamber were positioned near the bottom of the motor housing instead of near the top, the expansion chamber seal would either have to be so constructed as to provide a mercury column of from 4.2 to 5.6 inches, or the height of the motor housing above the mercury seal would have to be kept less than four feet three inches. It must also be borne in mind that usually space is at a premium where the present type of motor is employed and it is highly desirable to make the expansion chamber of only sufficient length to accommodate the normal expansion and contraction of the oil due to differences between operating and idle temperatures, respectively. The present invention makes it unnecessary to unduly increase the length of the expansion chamber and the amount of mercury in the seal just to take care of a temporary unbalanced condition which occurs only when the motor is initially filled with oil.

Assuming that the receiver 14 has been filled with pump liquid, the temperature of the motor and of the dielectric liquid will be that of the pump liquid. Upon energization of the motor, the heat developed in the stator core will be transmitted to the dielectric liquid and thence to the motor housing where it is dissipated by the pump liquid. The rise in temperature of the dielectric liquid will cause it to expand and, if the expansion chamber 25 has been initially filled with dielectric liquid so as to raise the separating member 30 to its uppermost position in contact with the stop ring 33, the excessive internal pressure created by expansion of the dielectric liquid will result in outward displacement of the three bodies of mercury in the mercury seals. Because of the predetermined relatively slight depth of immersion of the tube 52 in the mercury in the auxiliary seal 50, however, this seal will be broken and will permit the escape of dielectric into the pump liquid and thus limit the excess of internal pressure over external pressure to a value which is predetermined by the amount of mercury in the auxiliary seal. As previously stated, this excess pressure is safely below that which is required to break either of the other two seals or which would cause a loss of mercury therefrom.

It will be understood that contamination of the pump liquid by dielectric liquid during the initial period of adjustment of the unit when it is placed in operation for the first time is not objectionable, especially if it will result in complete isolation of the two liquids during subsequent operation under normal conditions.

Once any excess dielectric liquid has been displaced through the auxiliary seal, the subsequent contraction and expansion of the dielectric liquid will be compensated for by the movement of the separating member 30, which is free to move vertically in the expansion chamber between the stop ring 33 and the upper surface of the inner wall 27. The pressures of the internal and external liquids are thus equalized, and the two liquids are isolated from each other by bodies of sealing liquid.

The auxiliary seal 50 is also capable of being displaced in the opposite direction, to relieve excessive pressure in the pump liquid if such a condition should occur. This condition might be caused by a substantial decrease in the temperature of the pump liquid, which would result in a corresponding decrease in the temperature of the dielectric liquid and a consequent contraction thereof. In this event, when the motor is stopped and the dielectric liquid cools down, the separating member 30 may reach its lowermost position and come to rest on the upper surface of the inner wall 27 before the dielectric liquid has fully contracted. Upon further contraction of the dielectric liquid, the internal pressure would drop below that of the pump liquid, causing inward displacement of the mercury in the three mercury seals. As explained above, however, the auxiliary seal 50 will be broken first, allowing pump liquid to pass beneath the tube 52 and into the annular channel 56. We have shown the cross-sectional areas of the annular channel 56 and the interior of the tube 52 as substantially equal, thereby causing the mercury to rise to the same height when displaced in either direction, and the excess pressure required to break the seal 50 is, therefore, the same in either direction. However, these areas may be varied as desired to require a greater excess pressure in one direction than in the other.

As previously set forth, the present invention is particularly useful in conjunction with pumping apparatus for handling highly volatile liquids such as butane and propane, because such liquids are readily miscible with the oils commonly used as a dielectric liquid in the motor housing. These volatile liquids have vapor pressures greater than atmospheric pressure, and hence they present many special problems in connection with handling them. The pumping unit described herein is intended to be connected in a system wherein the pressure is at all times at least as great as the vapor pressure of the pump liquid, in order to maintain it in its liquid phase. It may be necessary or desirable, however, to remove the motor-pump unit from the receiver 14 for inspection or repair, in which case the pressure in the receiver must be reduced to atmospheric pressure before removing the cover plate 13. If a substantial amount of the volatile pump liquid in the receiver were permitted to vaporize within the receiver during the bleed-off operation, the consequent reduction in temperature would be such as might damage the equipment.

In order to enable the pump liquid to blow itself from the receiver, a blow-off line 65 is provided, extending from a point closely adjacent the bottom of the receiver upwardly to the cover plate and through the latter to a discharge point, whereby the pressure in the receiver is maintained at the vapor pressure of the liquid until the liquid level has reached the lower end of the blow-off line. It is also desirable to avoid trapping substantial bodies of pump liquid in the pump and in the auxiliary equipment, and therefore suitable drains are provided wherever such traps exist. For instance, it will be observed with reference to Fig. 3 that drain ports 66 are provided in the outer wall 26 of the expansion chamber 25, whereby the pump liquid may drain from the outer compartment 37. Also, as shown in Fig. 1, the main conduit 67 of the cooling system for circulating pump liquid over the motor housing is connected to the inlet of the lowermost stage of the pump 11, whereby the pump casing may be completely drained of pump liquid when venting the receiver. A lower drain port 68 and an upper vent port 69 are also provided in the wall of the adapted 70 interposed between the pump casing and the motor housing.

It will be apparent from the foregoing description that we have provided a submersible electric motor which, by reason of the novel and improved sealing and pressure-equalizing means, may be operated while submerged in a liquid which is readily miscible with the dielectric liquid in the motor housing. By the provision of a safety auxiliary seal, any initial variation from the proper quantity of dielectric liquid is promptly and automatically adjusted without causing displacement of the rotating liquid seal or of the main seal in the expansion chamber, and thereafter the internal liquids are completely isolated from each other and are maintained in pressure-balanced relation to each other.

While we have shown for purpose of illustration what we now consider to be the preferred form of the invention, it is to be understood that the invention is not limited to the precise details thereof, and that various modifications may be made therein within the spirit of the invention and the scope of the appended claims.

We claim:

1. A submersible electric motor comprising, in combination: a motor housing substantially filled with a dielectric liquid and adapted to be immersed in an external liquid; a stator and a rotor in said housing, said rotor having a rotor shaft extending through a wall of said housing; a liquid seal for sealing the juncture of said shaft and housing and including a cup member containing a body of sealing liquid and a baffle member having a lower edge extending below the surface of said sealing liquid; an explanation chamber comprising stationary walls and a relatively movable wall enclosing a chamber of variable volume; a second liquid seal for sealing the joint between said relatively movable wall and said stationary walls, said seal comprising a sealing liquid receptacle formed by said stationary walls and containing a second body of sealing liquid, said relatively movable wall having a portion thereof extending below the surface of the sealing liquid; conduit means connecting said variable volume chamber in open communication with said motor housing; auxiliary sealing means comprising a chamber containing a third body of sealing liquid and a stationary separating member having a lower edge extending below the surface of said third body of sealing liquid and dividing said chamber into inner and outer compartments; conduit means connecting said inner compartment in open communication with said motor housing and with said variable volume chamber; and said outer compartment having open communication with the external liquid.

2. A submersible electric motor as set forth in claim 1, in which the submergence of said stationary separating member below the surface of said third body of sealing liquid is substantially less than the submergence of said baffle member and of said movable wall below the surfaces of said first and second bodies of sealing liquid, respectively.

3. In a submersible electric motor, the combination of: a motor housing containing a dielectric liquid and adapted to be immersed in an external liquid; a stator and a rotor in said housing, said rotor having a rotor shaft extending through a wall of said housing; a first liquid seal for sealing the juncture of said shaft and housing; an expansion chamber associated with said motor housing and including relatively movable walls defining a compartment communicating with said motor housing, said walls being relatively movable to vary the volume of said compartment; a second liquid seal for sealing the joint between the relatively movable walls of said compartment; and a relatively stationary walls defining a third sealing chamber, and sealing liquid in said third sealing chamber and dividing the latter into separate compartments communicating respectively with said motor housing and said external liquid.

4. A submersible electric motor as set forth in claim 3, in which said third sealing chamber is disposed at substantially the same elevation as the upper extremity of said motor housing.

5. A submersible electric motor as set forth in claim 3, in which both said second and said third liquid seals are disposed at substantially the same elevation as said first liquid seal.

6. A submersible electric motor as set forth in claim 3, in which said third sealing chamber comprises a separating wall extending only a relatively short distance below the surface of the sealing liquid in said chamber, whereby a relatively slight excess of pressure in one of the compartments in said chamber may displace the sealing liquid in said one compartment below the lower extremity of said separating wall.

7. In a submersible electric motor the combination of: a motor housing containing a dielectric liquid and adapted to be immersed in an external liquid; a stator and a rotor in said housing, said rotor having a rotor shaft extending through a wall of said housing; a seal for sealing the juncture of said shaft and housing; relatively movable walls forming an expansion chamber communicating with said motor housing; and a seal for sealing the joint between said relatively movable walls; said expansion chamber being disposed externally of said motor housing with the upper extremity thereof at approximately the same elevation as the juncture of said rotor shaft and said motor housing.

ALADAR HOLLANDER.
VAINO A. HOOVER.

CERTIFICATE OF CORRECTION.

Patent No. 2,266,039. December 16, 1941.

ALADAR HOLLANDER, ET AL.

It is hereby certified that error appears in the printed specification of the above numbered patent requiring correction as follows: Page 5, first column, line 10-11, claim 1, for "explanation" read --expansion--; and second column, line 9, claim 3, strike out the article "a" after --and--; and that the said Letters Patent should be read with this correction therein that the same may conform to the record of the case in the Patent Office.

Signed and sealed this 10th day of February, A. D. 1942.

(Seal)

Henry Van Arsdale,
Acting Commissioner of Patents.